United States Patent
Moyer

(10) Patent No.: US 6,954,826 B2
(45) Date of Patent: Oct. 11, 2005

(54) READ ACCESS AND STORAGE CIRCUITRY READ ALLOCATION APPLICABLE TO A CACHE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 50 days.

(21) Appl. No.: 10/442,718

(22) Filed: May 21, 2003

(65) Prior Publication Data

US 2004/0236911 A1 Nov. 25, 2004

(51) Int. Cl.[7] .............................................. G06F 12/00
(52) U.S. Cl. ........................ 711/119; 711/118; 711/154; 711/170
(58) Field of Search .............................. 711/100, 117, 711/118, 154, 170, 119

(56) References Cited

U.S. PATENT DOCUMENTS

| | | | |
|---|---|---|---|
| 5,471,598 A | * | 11/1995 | Quattromani et al. ....... 711/122 |
| 5,689,679 A | | 11/1997 | Jouppi |
| 6,353,829 B1 | * | 3/2002 | Koblenz et al. ............. 707/100 |
| 6,496,902 B1 | | 12/2002 | Faanes et al. |
| 6,665,774 B2 | * | 12/2003 | Faanes et al. ............... 711/118 |
| 6,684,296 B2 | * | 1/2004 | Hayler et al. ............... 711/118 |

* cited by examiner

Primary Examiner—Tuan V. Thai
(74) Attorney, Agent, or Firm—Susan C. Hill; Joanna G. Chiu

(57) ABSTRACT

A read allocation indicator (e.g. read allocation signal 30) is provided to storage circuitry (e.g. cache 22) to selectively determine whether read allocation will be performed for the read access. Read allocation may include modification of the information content of the cache (22) and/or modification of the read replacement algorithm state implemented by the read allocation circuitry (70) in cache (22). For certain types of debug operations, it may be very useful to provide a read allocation indicator that ensures that no unwanted modification are made to the storage circuitry during a read access. Yet other types of debug operations may want the storage circuitry to be modified in the standard manner when a read access occurs.

26 Claims, 3 Drawing Sheets

READ ACCESS AND STORAGE CIRCUITRY READ ALLOCATION APPLICABLE TO A CACHE

FIELD OF THE INVENTION

The present invention relates in general to storage circuitry read allocation, and more particularly to storage circuitry read allocation applicable to a cache.

RELATED ART

In prior art data processing systems, a read access which misses in a cache will cause a cache line in the cache to be allocated according to the cache's read replacement algorithm. This is the behavior that is typically desired during normal operation of the cache. However, this behavior can be problematic under certain circumstances.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In prior art data processing systems, a read access by a debugger which misses in an L2 cache will cause a cache line in the L2 cache to be allocated, potentially replacing a currently valid and potentially modified cache line. This may be the desired result if the debugger is single-stepping through a series of instructions to be executed. However, this may cause a problem if the debugger is reading the contents of the cache merely for visibility purposes. The present invention addresses this problem, as well as a number of other problems relating to read access and storage circuitry read allocation.

Figure 1:
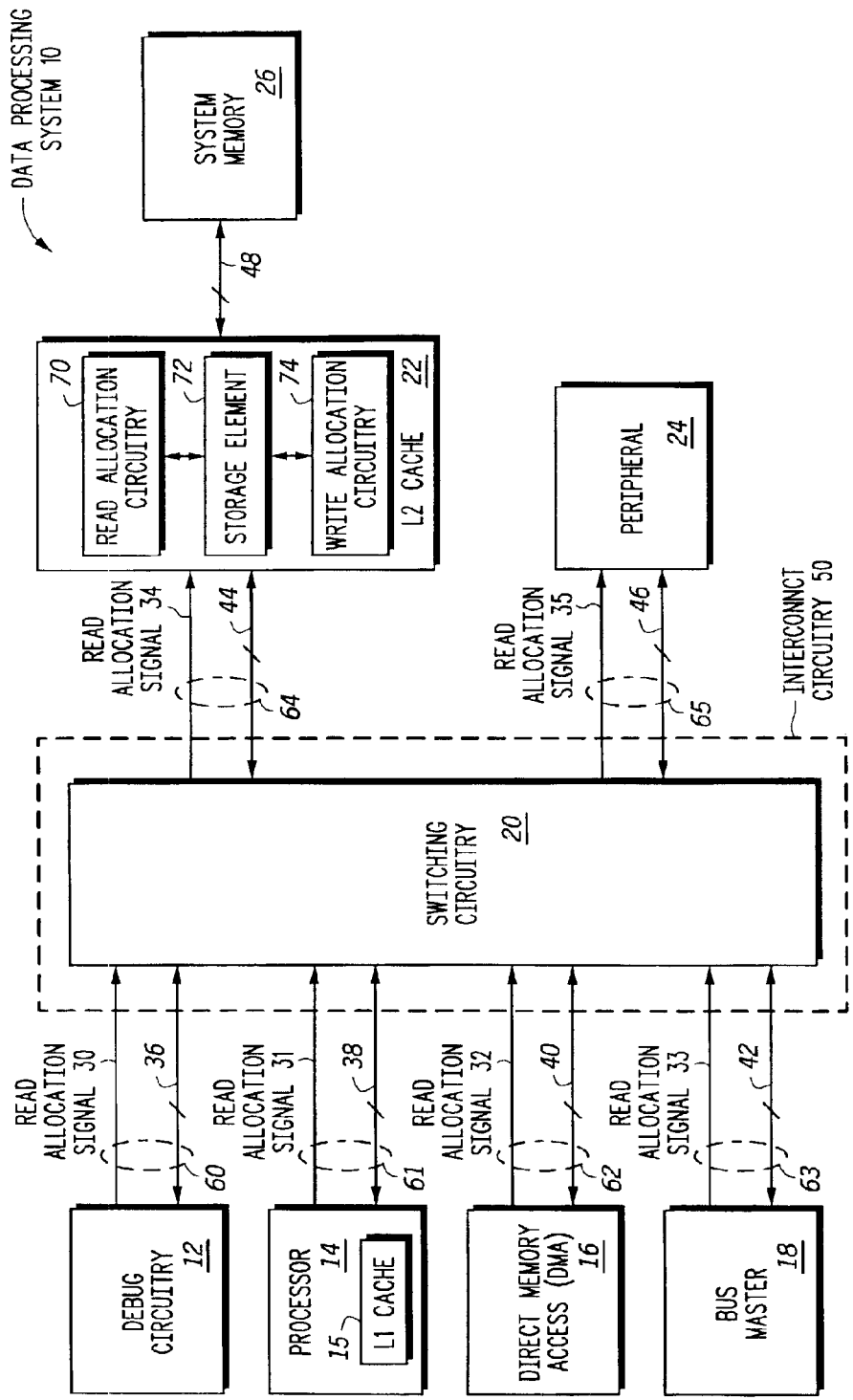
FIG. 1 illustrates, in block diagram form, a data processing system in accordance with one embodiment of the present invention.

FIG. 1 illustrates a data processing system 10 in accordance with one embodiment of the present invention. In one embodiment, data processing system 10 includes debug circuitry 12, which is bi-directionally coupled to switching circuitry 20 by way of signals 36 and which provides read allocation signal 30 to switching circuitry 20. In one embodiment, data processing system 10 also includes processor 14, which is bi-directionally coupled to switching circuitry 20 by way of signals 38 and which provides read allocation signal 31 to switching circuitry 20. In one embodiment, data processing system 10 also includes direct memory access (DMA) 16, which is bi-directionally coupled to switching circuitry 20 by way of signals 40 and which provides read allocation signal 32 to switching circuitry 20.

In one embodiment, data processing system 10 also includes bus master 18, which is bi-directionally coupled to switching circuitry 20 by way of signals 42 and which provides read allocation signal 33 to switching circuitry 20. In one embodiment, data processing system 10 also includes L2 cache 22, which is bi-directionally coupled to switching circuitry 20 by way of signals 44 and which receives read allocation signal 34 from switching circuitry 20. In one embodiment, data processing system 10 also includes peripheral 24, which is bi-directionally coupled to switching circuitry 20 by way of signals 46 and which receives read allocation signal 35 from switching circuitry 20.

Note that in one embodiment of the present invention, one of read allocation signals 30–33 is provided by switching circuitry 20 as read allocation signal 34, depending upon which one of 12, 14, 16, or 18 initiates a read access to L2 cache 22. Note that in one embodiment of the present invention, one of read allocation signals 30–33 is provided by switching circuitry 20 as read allocation signal 35, depending upon which one of 12, 14, 16, or 18 initiates a read access to peripheral 24.

In one embodiment of the present invention, processor 14 includes an L1 cache 15 that is coupled to processor 14. Although the L1 cache 15 has been shown as being more directly coupled to processor 14 than the L2 cache 22, alternate embodiments of the present invention may have any number of caches that are coupled to processor 14 in any desired manner. In alternate embodiments of the present invention, the L1 cache 15 and the L2 cache 22 need not be caches, but may be any type of storage circuitry that has read allocation capability. In one embodiment of the present invention, L2 cache 22 is bi-directionally coupled to system memory 26 by way of conductors 48.

In one embodiment of the present invention, read allocations signal 30 and signals 36 are portions of a bus 60; read allocations signal 31 and signals 38 are portions of a bus 61; read allocations signal 32 and signals 40 are portions of a bus 62; read allocations signal 33 and signals 42 are portions of a bus 63; read allocations signal 34 and signals 44 are portions of a bus 64; and read allocations signal 35 and signals 46 are portions of a bus 65. Buses 60–65 may be the same bus, or may be one or more subsets of a common bus having a common bus protocol. Alternately, different ones of buses 60–65 may use the same bus protocol or different bus protocols. In alternate embodiments of the present invention, interconnect circuitry 50 may not use any bus structure or bus protocol. In one embodiment of the present invention, interconnect circuitry 50 includes switching circuitry 20 and buses 60–65; however, interconnect circuitry 50 can be implemented in any manner. As used herein, the term "bus" is used to refer to a plurality of signals or conductors which may be used to transfer one or more various types of information, such as data, addresses, control, or status.

In one embodiment of the present invention, L2 cache 22 includes read allocation circuitry 70 and write allocation circuitry 74 which are each bi-directionally coupled to storage element 72. Storage element 72 may be used to store information, such as data or instructions that have been cached, as well as history bits and cache tags for some embodiments of the present invention. In alternate embodiments of the present invention, storage element 72 may be implemented in any desired manner and may store any desired information.

In the embodiment of the present invention illustrated in FIG. 1, debug circuitry 12, processor 14, direct memory access (DMA) 16, and bus master 18 may each be an access initiator which initiates a read access to L2 cache 22. Alternate embodiments of the present invention may use different configurations. For example, alternate embodiments of the present invention may have fewer, more, or different blocks of circuitry than 12, 14, 16, and 18 which initiate read accesses to L2cache 22. Bus master 18 may be any type of circuitry that is capable of initiating a read access to the L2 cache 22 across buses 63 and 64. If interconnect circuitry 50 does not use a bus having a bus protocol, circuitry 18 may not be a bus master, but instead may be any type of circuitry that is capable of initiating a read access to the L2 cache 22.

Figure 2:
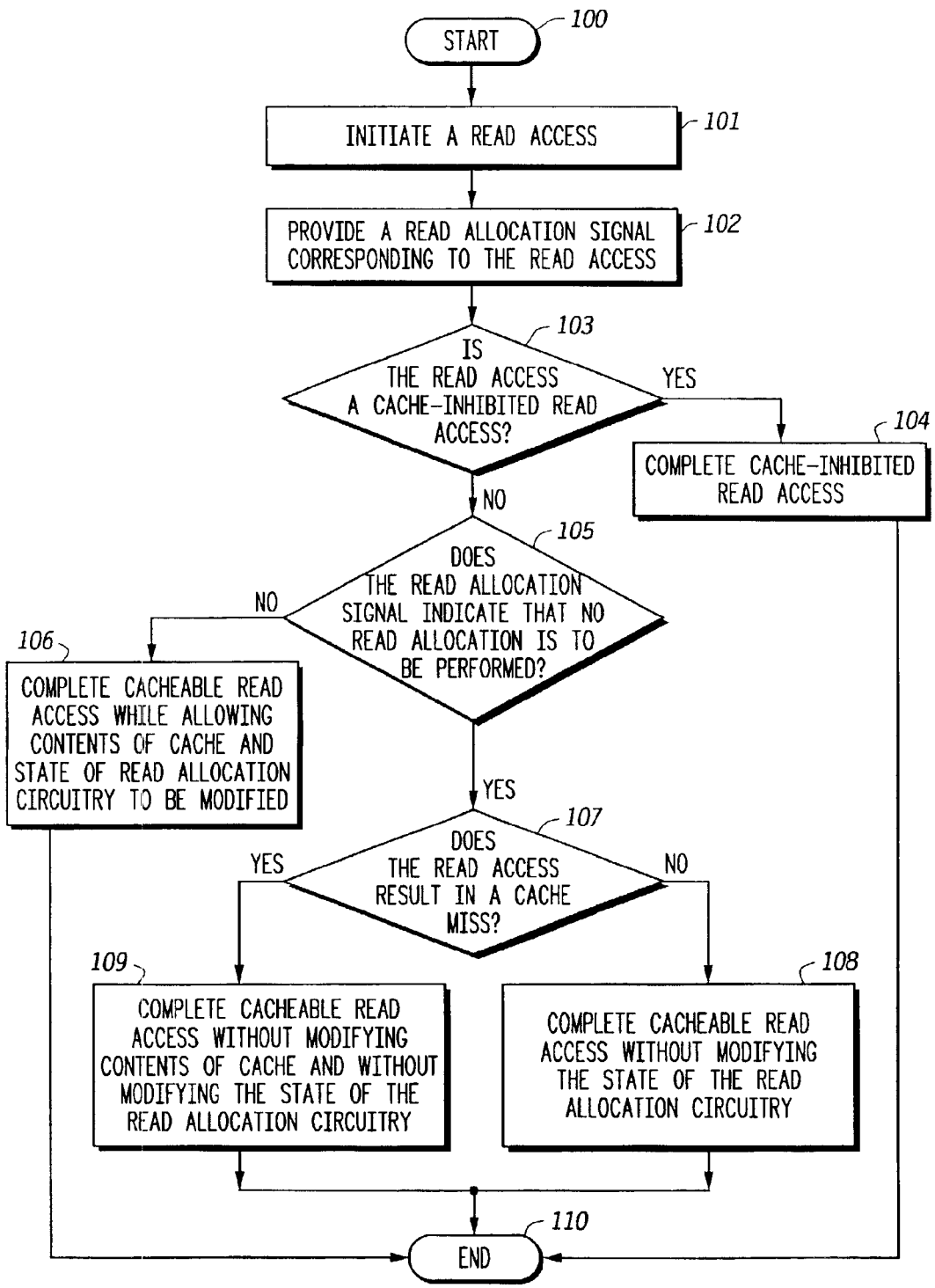
FIG. 2 illustrates, in flow diagram form, a read access to a cache in accordance with one embodiment of the present invention.

FIG. 2 illustrates, in flow diagram form, a read access to an L2 cache 22 (see FIG. 1) in accordance with one embodiment of the present invention. The flow starts at start oval 100. The flow then continues to step 101 where a read access is initiated. The flow continues to step 102 where a read allocation signal corresponding to the read access is provided. Referring to FIG. 1, any one of circuitry 12, 14, 16, or 18 may initiate a read access and will subsequently provide the read allocation signal. The flow then continues to decision diamond 103 where the question is asked "is the read access a cache-inhibited read access?". If the answer to decision diamond 103 is yes, the flow continues to step 104 where the cache-inhibited read access is completed. From step 104, the flow finishes at end oval 110. If the answer to decision diamond 103 is no, the flow continues to decision diamond 105 where the question is asked "does the read allocation signal indicate that no read allocation is to be performed?". If the answer to decision diamond 105 is no, the flow continues to step 106 where the cacheable read access is completed while allowing the contents of the cache and the state of the read allocation circuitry to be modified. From step 106, the flow finishes at end oval 110. If the answer to decision diamond 105 is yes, the flow continues to decision diamond 107 where the question is asked "does the read access result in a cache miss?". If the answer to decision diamond 107 is no, the flow continues to step 108 where the cacheable read access is completed without modifying the state of the read allocation circuitry. If the answer to decision diamond 107 is yes, the flow continues to step 109 where the cacheable read access is completed without modifying the contents of the cache and without modifying the state of the read allocation circuitry. In alternate embodiments of the present invention, decision diamond 103 is optional. If decision diamond 103 is not used, the flow continues from step 102 to decision diamond 105.

Figure 3:
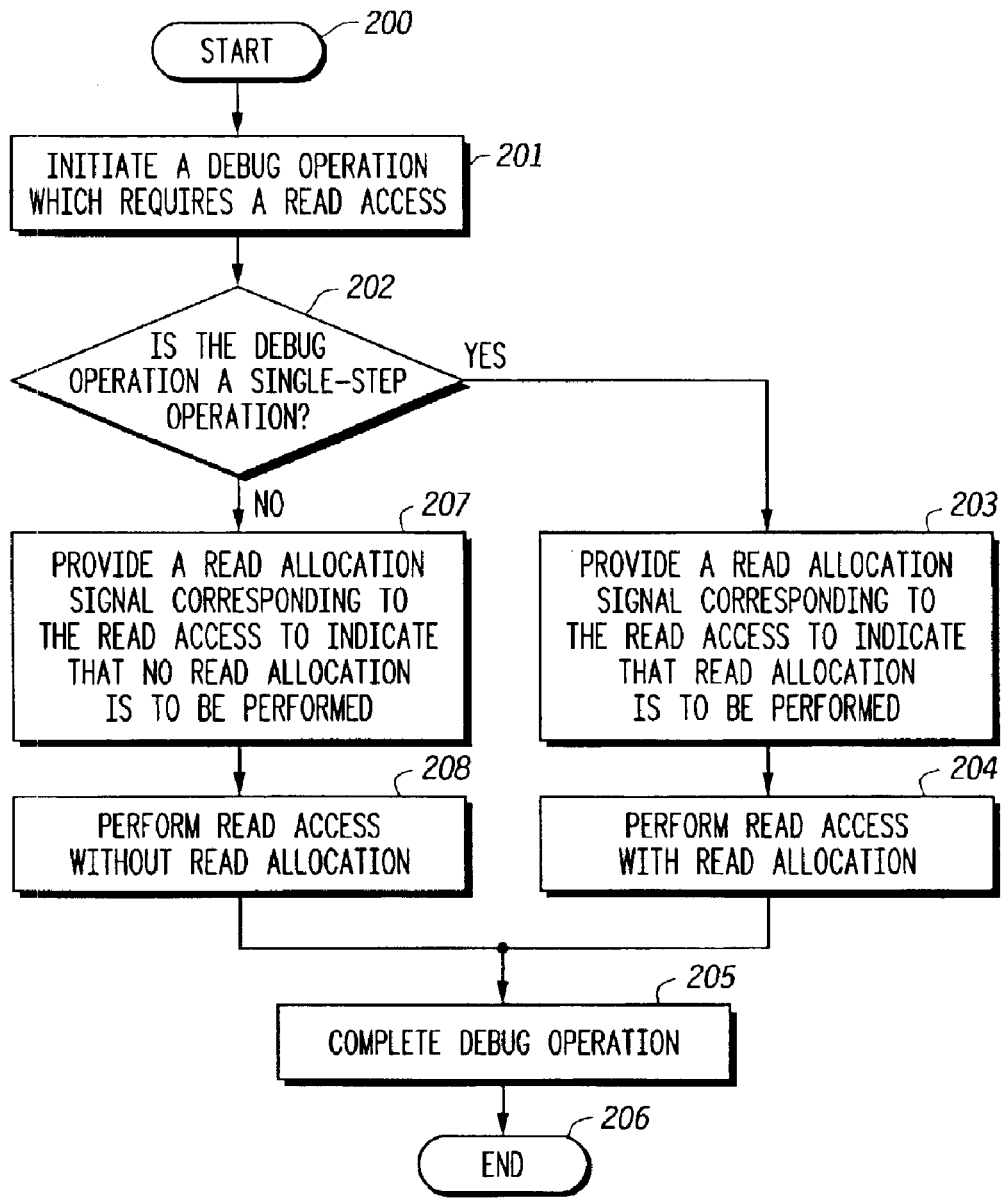
FIG. 3 illustrates, in flow diagram form, a debug operation which requires a read access to storage circuitry in accordance with one embodiment of the present invention.

FIG. 3 illustrates, in flow diagram form, a debug operation which requires a read access to storage circuitry in accordance with one embodiment of the present invention. In one embodiment of the present invention, debug circuitry 12 of FIG. 1 may be used to initiate and perform the debug operation. The flow starts at start oval 200. The flow then continues to step 201 where a debug operation which requires a read access is initiated. The flow continues to decision diamond 202 where the question is asked "is the debug operation a single-step operation?". If the answer to decision diamond 202 is yes, the flow continues to step 203 where a read allocation signal corresponding to the read access is provided to indicate that read allocation is to be performed. From step 203, the flow continues to step 204 where the read access with read allocation is performed. From step 204, the flow continues to step 205 where the debug operation is completed. From step 205, the flow finishes at end oval 206. If the answer to decision diamond 202 is no, the flow continues to step 207 where a read allocation signal corresponding to the read access is provided to indicate that no read allocation is to be performed. From step 207, the flow continues to step 208 where the read access without read allocation is performed. From step 208, the flow continues to step 205 where the debug operation is completed. From step 205, the flow finishes at end oval 206.

There are certain applications, such as, for example, certain types of debug operations, where it is advantageous for read accesses performed to system memory 26 to be unobtrusive to one or more of the caches (e.g. L2 cache 22). This requires that no modification of cache state and/or contents should occur when a read access is performed. This is important, since debugging of the data processing system may cause other undesired side-effects if cache state and/or contents are modified. In addition, side-effects may cause the problem being debugged to change character, or to not be manifested, which would prevent debugging from being successful. On the other hand, there are certain applications, such as, for example, other debug operations (e.g. single-stepping through user application instructions) where it is advantageous for read accesses performed to system memory 26 to cause the same modifications to be made to one or more of the caches (e.g. L2 cache 22) as would occur during normal operation. It is thus very useful to be able to selectively perform read allocation in a cache or other storage circuitry based upon the debug operation type.

In one embodiment of the present invention, a read allocation signal (e.g. 30, 31, 32, or 33) is used as a read allocation indicator to indicate whether or not read allocation is to be performed (e.g. in cache 22). If read allocation does not occur, then a read access is performed without modifying the information content of cache 22 and/or without modifying the read allocation state of cache 22. Some embodiments of the present invention prevent modification of the information content of cache 22, some embodiment of the present invention prevent modification of the read allocation state of cache 22, and some embodiments of the present invention prevent both modification of the information content of cache 22 and the read allocation state of cache 22. The content of cache 22 is the information that is stored in storage element 72 (see FIG. 1). The read allocation circuitry 70 is used to implement the read replacement algorithm used in cache 22. A read replacement algorithm is the rule or set of rules that are used to determine which cache line will be replaced next when the cache misses on a read access. The present invention may be used with any desired read replacement algorithm. Thus, the read replacement algorithm implemented by read allocation circuitry 70 may be any desired replacement algorithm. The replacement algorithm steps through a series of states as each cache miss occurs in order to always have an updated value for which cache line should be filled for the next subsequent cache miss on a read access.

For some embodiments of the present invention (e.g. embodiments using one or more selected types of debug operations), it is not enough to prevent modification of the information content of the cache; the current state of the read replacement algorithm (e.g. the read allocation state) of read allocation circuitry 70 must also not be affected. Note that some embodiments of the present invention may optionally have write allocation circuitry 74 which determines the behavior of cache 22 for write accesses. Alternate embodiments of the present invention may not even have write allocation circuitry 74. In some embodiments of the present invention, the operation and replacement algorithm of the read allocation circuitry 70 is totally independent of the operation and replacement algorithm of the write allocation circuitry 74. Some embodiments of the present invention may have common replacement algorithms for both read and write cache misses. In such embodiments, read allocation circuitry 70 and write allocation circuitry 74 may be combined into a single and/or common circuitry, although it is important to note that read allocation and write allocation present entirely different problems to a user or debugger of data processing system 10.

Although the present invention has been described in the context of specific embodiments that use a cache 22, alternate embodiments of the present invention may use any type of storage circuitry that has read allocation capability. The present invention is not limited to cache applications. Also, although the present invention is useful for debug operation, the present invention may be used for any desired purpose and is not limited to use in debug operations. As one possible example of a different use, processor 14 may selectively determine that read allocation should not be performed in one or more caches because the data in the read access is not likely to be reused, thus it may be advantageous to prevent the read access from causing replacement of potentially more useful information already contained in a cache.

Note that the present invention may also be used with the L1 cache 15. For this embodiment, a read allocation signal (not shown) may be provided from processor 14 to the L1 cache 15. This read allocation signal (not shown) may function in a same or similar manner to read allocations signals 30–35. Also, the present invention may be used with peripheral 24. The read allocation signal 35 may function in a same or similar manner to read allocation signal 34 provided to L2cache 22.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus, comprising:
   storage circuitry; and
   access initiating circuitry coupled to the storage circuitry, the access initiating circuitry initialing a read access to the storage circuitry and providing a read allocation indicator to the storage circuitry corresponding to the reed access,
   wherein a value of the read allocation indicator is independent of any valid bits stored in the storage circuitry.

2. The apparatus of claim 1, wherein, based on the read allocation indicator, a read allocation is selectively performed during the read access.

3. The apparatus of claim 2, wherein when the value of the read allocation indicator has a first value, the read access is performed with read allocation and when the value of the read allocation indicator has a second value, the read access is performed without read allocation.

4. The apparatus of claim 1, wherein the storage circuitry is coupled to the access initiating circuitry via interconnect circuitry.

5. The apparatus of claim 4, wherein the interconnect circuitry comprises a system bus coupled to the storage circuitry and the access initiating circuitry, and wherein the read allocation indicator is provided via the system bus.

6. The apparatus of claim 4, wherein the storage circuitry comprises a cache and the access initiating circuitry comprises debug circuitry, wherein the read access is part of a debug operation.

7. The apparatus of claim 1, wherein the storage circuitry comprises a cache.

8. The apparatus of claim 7, wherein the access initiating circuitry comprises a processor.

9. The apparatus of claim 8, wherein the processor comprises the cache.

10. That apparatus of claim 1, wherein the access initiating circuitry comprises a direct memory access (DMA).

11. The apparatus of claim 1, wherein the access initiating circuitry comprises debug circuitry, wherein the read access is part of a debug operation.

12. A method for performing a read access, comprising:
    initiating a read access;
    providing a read allocation indicator corresponding to the read access; and
    selectively performing read allocation, based at least on the read allocation indicator, during the read access,
    wherein the read access is to a cache, and
    wherein a value of the read allocation indicator is independent of any valid bits stored in the cache.

13. The method of claim 12, wherein the read access is a cacheable read access to the cache, and wherein the method further comprises:
    determining whether the cacheable read access results in one of a cache hit or a cache miss; and
    when the cacheable read access results in a cache miss, completing the cacheable read access without modifying contents of the cache.

14. The method of claim 13, further comprising:
    when the cacheable read access results in a cache miss, completing the cacheable read access without modifying an allocation state of the cache.

15. The method of claim 13, further comprising:
    when the cacheable read access results in a cache bit, completing the cacheable read access without modifying an allocation state of the cache.

16. The method of claim 12, further comprising:
    determining whether the read access is one of a cacheable read access or a cache-inhibited read access.

17. The method of claim 12, wherein the read access is a cacheable read access to the cache, and wherein the cache is capable of performing write allocation during a write access to the cache.

18. The method of claim 12, wherein the read access is within a debug operation, and wherein selectively performing read allocation is based at least on the read allocation indicator and the debug operation.

19. The method of claim 18, wherein read allocation is performed during a single-step debug operation.

20. An apparatus, comprising:
    a storage element for storing information; and read allocation circuitry coupled to the storage element, the read allocation circuitry responsive to a read allocation indicator wherein, based on the read allocation indicator, the read allocation circuitry selectively performs read allocation during a read access to the storage element, wherein a value of the read allocation indicator is independent of tag valid bits and data valid bits stored in the storage circuitry.

21. The apparatus of claim 20, further comprising a cache, wherein the cache comprises the storage element.

22. The apparatus of claim 21, wherein, based on the read allocation indicator, the read allocation circuitry selectively prevents modification of the stored information in the storage element when the read access to the storage element results in a cache miss.

23. The apparatus of claim 21, wherein the read allocation circuitry stores a read allocation state of the cache, and wherein based on the read allocation indicator, the read allocation circuitry selectively prevents modification of the read allocation state of the cache.

24. The apparatus of claim 23, wherein, based on the read allocation indicator, the read allocation circuitry selectively prevents modification of the read allocation state of the cache when the read access to the storage element results in a cache hit.

25. The apparatus of claim 20, wherein the read allocation circuitry further comprises an input, wherein the read allocation indicator is provided via the input.

26. The apparatus of claim 25, wherein the read allocation indicator is provided as a bus signal via the input.

* * * * *

UNITED STATES PATENT AND TRADEMARK OFFICE
CERTIFICATE OF CORRECTION

PATENT NO.       : 6,954,826 B2                                     Page 1 of 1
APPLICATION NO.  : 10/442718
DATED            : May 21, 2003
INVENTOR(S)      : William C. Moyer It is certified that error appears in the above-identified patent and that said Letters Patent is hereby corrected as shown below:

In Column 5, Line 57, Claim 1:

Change "circuitry initialing" to --circuitry initiating--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,954,826 B2 |
| APPLICATION NO. | : 10/442718 |
| DATED | : October 11, 2005 |
| INVENTOR(S) | : William C. Moyer |

It is certified that error appears in the above-identified patent and that said Letters Patent is hereby corrected as shown below:

In Column 5, Line 57, Claim 1:

Change "circuitry initialing" to --circuitry initiating--

This certificate supersedes the Certificate of Correction issued May 20, 2008.

Signed and Sealed this

Seventeenth Day of June, 2008

JON W. DUDAS
*Director of the United States Patent and Trademark Office*